(12) United States Patent
Hwang

(10) Patent No.: US 6,918,508 B2
(45) Date of Patent: Jul. 19, 2005

(54) REUSABLE PRODUCE CRATE WITH DETACHABLE LID

(75) Inventor: Philip C. Hwang, Alpharetta, GA (US)

(73) Assignee: Rehrig Pacific Company, Los Angeles, CA (US)

(*) Notice: Subject to any disclaimer, the term of this patent is extended or adjusted under 35 U.S.C. 154(b) by 33 days.

(21) Appl. No.: 10/042,841

(22) Filed: Jan. 9, 2002

(65) Prior Publication Data

US 2002/0056717 A1 May 16, 2002

Related U.S. Application Data

(60) Division of application No. 09/523,622, filed on Mar. 13, 2000, now Pat. No. 6,338,181, which is a continuation of application No. 09/028,822, filed on Feb. 24, 1998, now Pat. No. 6,036,049, which is a continuation-in-part of application No. 08/840,244, filed on Apr. 17, 1997, now Pat. No. 5,992,673.

(51) Int. Cl.$^7$ ................................ B65D 51/04
(52) U.S. Cl. ............. 220/826; 220/817; 220/819; 220/833; 220/836; 220/841; 16/266
(58) Field of Search ................ 220/810, 817, 220/818, 819, 826, 833, 836, 840, 841, 847, 845, FOR 192, FOR 195, FOR 196; 16/266, 260, 267, 386, 268, 257

(56) References Cited

U.S. PATENT DOCUMENTS

| | | | |
|---|---|---|---|
| 906,644 A | * 12/1908 | Meade | .............. 206/237 |
| 2,052,465 A | 8/1936 | Hardy, Jr. | |
| 2,953,244 A | 9/1960 | Phillips | |
| 2,963,734 A | * 12/1960 | Huget | .............. 16/266 |
| 3,126,120 A | 3/1964 | Crate | |
| 3,610,460 A | 10/1971 | Siklos | |
| 4,143,695 A | 3/1979 | Hoehn | |
| 4,161,261 A | 7/1979 | Frater | |

(Continued)

FOREIGN PATENT DOCUMENTS

DE            1 206 615        * 12/1965    ........ 220/FOR 195

OTHER PUBLICATIONS

Paxton Brochure, p. 10 (Undated but believed to be prior art).

Primary Examiner—Robin A. Hylton
(74) Attorney, Agent, or Firm—Brooks Kushman P.C.

(57) ABSTRACT

A container for housing produce comprising a generally rectangular bottom, generally rectangular opposed first and second side and end walls extending upwardly and outwardly from the bottom, and a pivot member on an upper edge of the first side wall. A lid comprising two panels is provided, each panel having first and second side edges and a hinge edge, the first side edges being detachably and pivotally secured to the pivot member. A hinge operatively connects the hinge edges of the two panels. Resilient flanges are provided on the second side edges of the panels to releasably engage shoulders formed on an upper edge of the second side wall when the lid is closed. To nest multiple containers one within another, the lid is removed from the side wall, folded 180° about its hinge, rotated 90° and placed in the bottom of the container. Another container is then placed in the container and the process is repeated.

26 Claims, 9 Drawing Sheets

U.S. PATENT DOCUMENTS

| | | | |
|---|---|---|---|
| 4,412,616 A | | 11/1983 | Williams |
| 4,606,471 A | * | 8/1986 | Quercetti ................... 220/555 |
| 4,685,567 A | | 8/1987 | Webb |
| 4,741,032 A | * | 4/1988 | Hampton ................... 220/836 |
| 4,765,480 A | | 8/1988 | Malmanger |
| 4,852,725 A | * | 8/1989 | Folsom ...................... 220/810 |
| 4,989,747 A | * | 2/1991 | Demurger .................. 220/324 |
| 5,048,715 A | | 9/1991 | Wolff |
| 5,065,887 A | * | 11/1991 | Schuh et al. ................ 220/835 |
| 5,070,577 A | | 12/1991 | Bonneville et al. |
| 5,088,616 A | | 2/1992 | Susko et al. |
| 5,146,650 A | | 9/1992 | Robertson |
| 5,253,758 A | | 10/1993 | Bissell, II |
| 5,269,046 A | | 12/1993 | Newby, Sr. |
| 5,294,413 A | | 3/1994 | Riihimaki et al. |
| 5,392,915 A | | 2/1995 | Kalin |
| 5,415,293 A | | 5/1995 | Ackermann et al. |
| 5,423,106 A | | 6/1995 | Peyret |
| 5,555,996 A | | 9/1996 | Lang-Ree et al. |
| 5,669,106 A | * | 9/1997 | Daoud ........................ 16/266 |
| D384,582 S | | 10/1997 | Cain |
| 5,673,791 A | | 10/1997 | Jamison |
| 5,938,063 A | * | 8/1999 | Hoftman .................... 220/326 |
| 5,992,673 A | | 11/1999 | Hwang |
| 6,036,049 A | | 3/2000 | Hwang |
| 6,050,442 A | * | 4/2000 | Wysocki .................... 220/840 |
| 6,186,357 B1 | * | 2/2001 | Kyle .......................... 220/841 |
| 6,338,181 B1 | * | 1/2002 | Hwang ........................ 16/266 |
| 6,354,461 B1 | * | 3/2002 | Tenney et al. .............. 220/836 |

* cited by examiner

REUSABLE PRODUCE CRATE WITH DETACHABLE LID

This application is a divisional of U.S. application Ser. No. 09/523,622 filed Mar. 13, 2000, now U.S. Pat. No. 6,338,181, which is a continuation of U.S. application Ser. No. 09/028,822 filed Feb. 24, 1998, now U.S Pat. No. 6,036,049, which is a continuation-in-part of U.S. application Ser. No. 08/840,244 filed Apr. 17, 1997, now U.S. Pat. No. 5,992,673.

The present invention is directed to a reusable produce crate, and more particularly, to a reusable produce crate having a detachable lid with an internal hinge formed such that the lid can be folded in half and stored in the bottom of the crate.

BACKGROUND

Crates for housing produce are well known in the industry. Such crates, or containers, typically comprise a bottom, opposed end and side walls, and a lid. The lids of the containers may be hinged to a side wall of the container or may be detached lids which are placed on the container when in use. It is desirable to minimize the space required for storing the containers. One method of storing such containers to conserve space is to stack them in a nesting manner one within another. When containers with detached lids are stacked in such a manner the lids must be removed in order to allow the containers to properly nest. The lids therefore are prone to being misplaced and present additional storage and handling problems. Containers with hinged lids may not have enough clearance when the lids are opened to be able to nest containers, and the hinged lids may present other problems when attempting to nest containers.

U.S. Pat. No. 5,555,996 to Lang-Ree et. al. shows a container with a split lid, each section of the lid being hinged to an upper edge of a side wall of the container. When nesting multiple containers of this type, the lids remain hinged to the side walls and hang down along outer surfaces of the side walls which increases the floor space required to store the containers.

U.S. Pat. No. 5,392,915 to Kalin shows a container having a detached lid which is mountable at several locations along the side walls of the container. The lid of this container cannot be stored in the bottom of the container when multiple containers are nested.

U.S. Pat. No. 5,415,293 to Ackerman et. al. shows a container having a detached lid which also cannot be stored in the bottom of the container.

It is an object of the present invention to provide a reusable produce crate which reduces or wholly overcomes some or all of the aforesaid difficulties inherent in prior known devices. Particular objects and advantages of the invention will be apparent to those skilled in the art, that is, those who are knowledgeable and experienced in this field of technology, in view of the following disclosure of the invention and detailed description of certain preferred embodiments.

SUMMARY

The principles of the invention may be used to advantage to provide a reusable produce crate or container having a detachably hinged lid, the lid having an internal hinge which allows the lid to be folded in half and stored on the bottom of the container. Multiple containers can then be stacked in a nesting manner while ensuring that their associated lids are stored with the containers.

In accordance with a first aspect, a container comprises a generally rectangular bottom, generally rectangular opposed first and second side and end walls extending upwardly and outwardly from the bottom, and a pivot member on an upper edge of the first side wall. A lid comprising two panels is provided, each panel having first and second side edges and a hinge edge, the first side edges being detachably and pivotally secured to the pivot member. A hinge operatively connects the hinge edges of the two panels to one another.

In accordance with another aspect, resilient flanges are provided on the second side edges of the panels to positively engage shoulders formed on an upper edge of the second side wall when the lid is closed.

To nest multiple containers one within another, in accordance with certain preferred embodiments, the lid is removed from the side wall, folded 180° about its hinge, rotated 90°, and placed in the bottom of the container. Another container is then placed in the container, its lid is removed in a similar manner, and the process is repeated for each successive container which is to be nested in a stack of containers.

Substantial advantage is achieved by providing a reusable produce container having such a detachable hinged lid. Since the lids are stored within the containers when multiple containers are stacked in a nesting fashion, the potential for losing lids is reduced. The ability to nest the containers along with their lids also improves the handling of the containers as well as reducing the space required to store the containers, thereby reducing costs.

From the foregoing disclosure, it will be readily apparent to those skilled in the art, that is, those who are knowledgeable or experienced in this area of technology, that the present invention provides a significant technological advance. Preferred embodiments of the reusable produce container of the present invention can provide improved handling, a reduction in the space required to store containers, and reduction in potential for lost lids. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
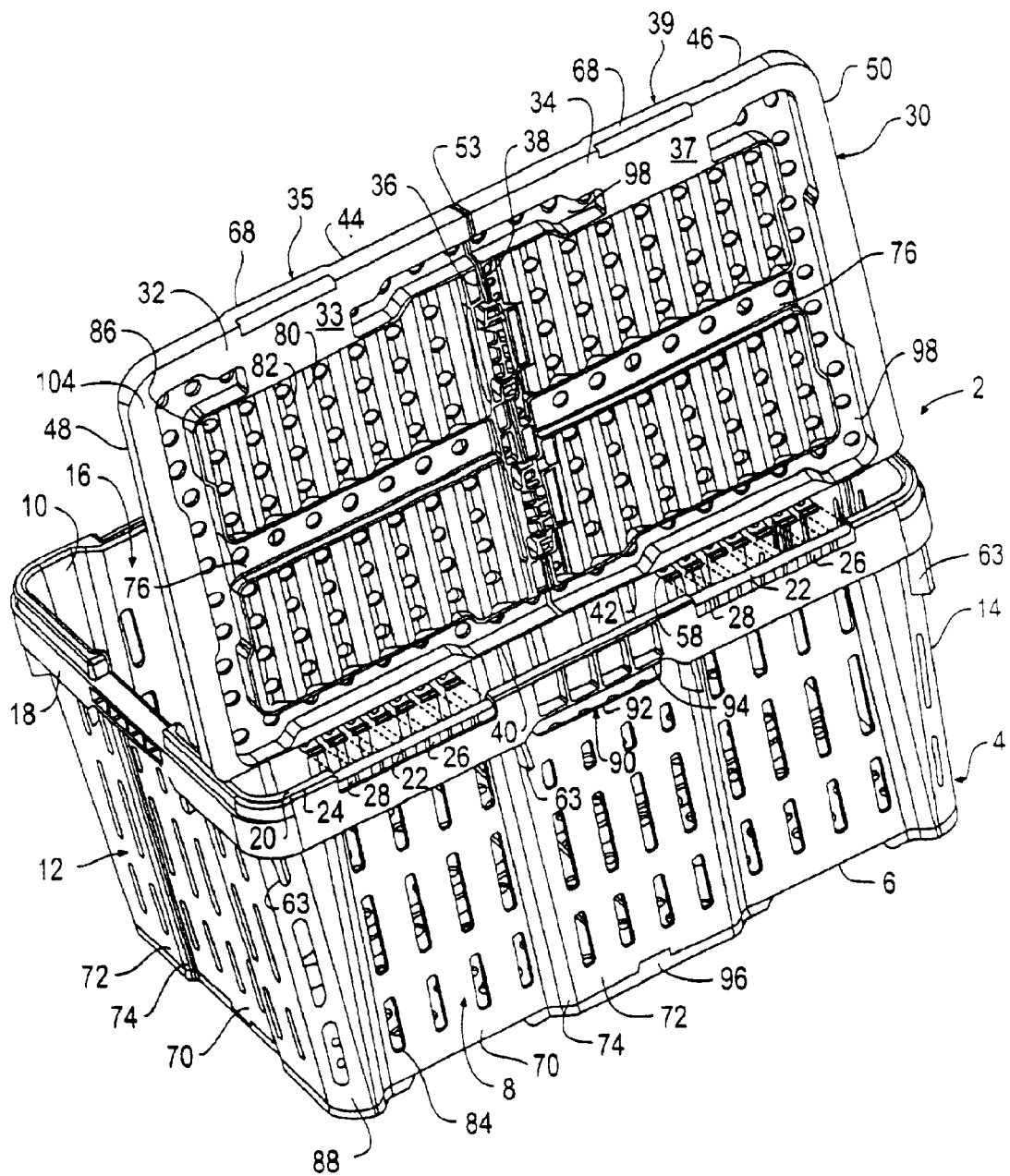
FIG. 1 is a schematic perspective view of a container of the present invention shown with the lid detached from the container body.

The figures referred to above are not drawn necessarily to scale and should be understood to present a simplified representation of the invention, illustrative of the basic principles involved. Some features of the reusable produce container depicted in the drawings have been enlarged or distorted relative to others to facilitate explanation and understanding. The same reference numbers are used in the drawings for similar or identical components and features shown in various alternative embodiments. Reusable produce containers as disclosed above, will have configurations and components determined, in part, by the intended application and environment in which they are used.

DETAILED DESCRIPTION OF CERTAIN PREFERRED EMBODIMENTS

Turning now to FIG. 1, a preferred embodiment of the reusable produce crate or container 2 will be described in more detail. Container 2 may be formed by molding a high density plastic material, such as polyethylene, or the like. Container 2 comprises container body 4 formed of bottom 6, upstanding from which are upwardly and outwardly inclined opposed first and second side walls 8, 10 and opposed first and second end walls 12, 14 forming a rectangular top opening 16. Extending about the upper edges of the container walls and defining the top opening 16 is a lip 18 which imparts a rigidifying effect to the walls. The exterior face of lip 18 extends vertically, as contrasted with the inclination of the walls, and terminates in an upwardly facing, generally horizontal rim surface 20. Reinforcing the container body walls in this manner, not only strengthens the structure, but, due to the vertical orientation of the lip, enables the container walls to resist the application of lateral forces that occur during palletizing of the container. A pivot member comprising a pair of pivot pins 22 is formed along an upper edge 24 of first side wall 8. A plurality of slots 26 are formed along pivot pins 22 by legs 28 which are spaced along and interconnect pivot pins 22 and first side wall 8. Pivot pins 22 and legs 28 are preferably formed of one-piece construction with first side wall 8.

Figure 2:
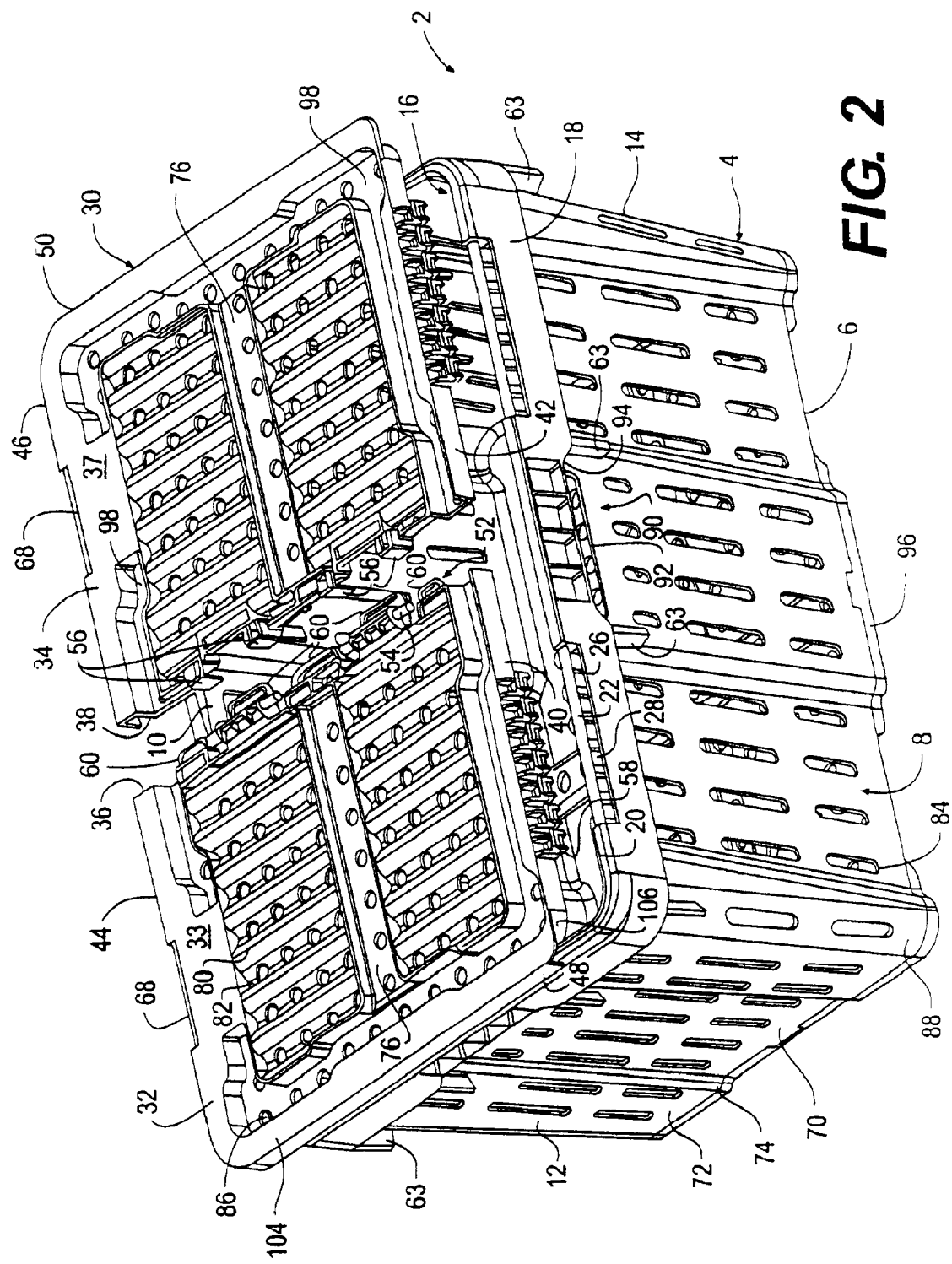
FIG. 2 is a schematic perspective view of the container of FIG. 1 shown with the panels of the lid in a preassembled condition.

Lid 30 is comprised of first and second panels 32, 34. First panel 32 is formed with hinge edge 36, first side edge 40, second side edge 44, end edge 48, top surface 33, and bottom surface 35. Second panel 34 is formed with hinge edge 38, first side edge 42, second side edge 46, end edge 50, top surface 37, and bottom surface 39 Hinge edges 36, 38 are pivotally secured to one another by hinge 52 with gap 53 provided between hinge edges 36, 38 when they are so secured. The construction of hinge 52 along with gap 53 allows lid 30 to be folded a full 180° about hinge 52. As seen in FIG. 2, hinge 52 comprises hinge pins 54 which are formed along hinge edge 36 of first panel 32, and pin housings 56 which are downwardly opening pockets formed along hinge edge 38 of second panel 34. Hinge 52 is typically assembled soon after lid 30 is molded and therefore still warm. Hinge pins 54 are snapped into their respective pin housings 56 with the application of slight pressure. Thereafter, when lid 30 has cooled, hinge pins 54 are positively retained within pin housings 56 such that a large force is necessary to separate them. Hinge pins 54 are preferably formed of one-piece construction with first panel 32, while pin housings 56 are preferably formed of one-piece construction with second panel 34. Such one-piece construction reduces manufacturing costs and complexity.

Figure 3:
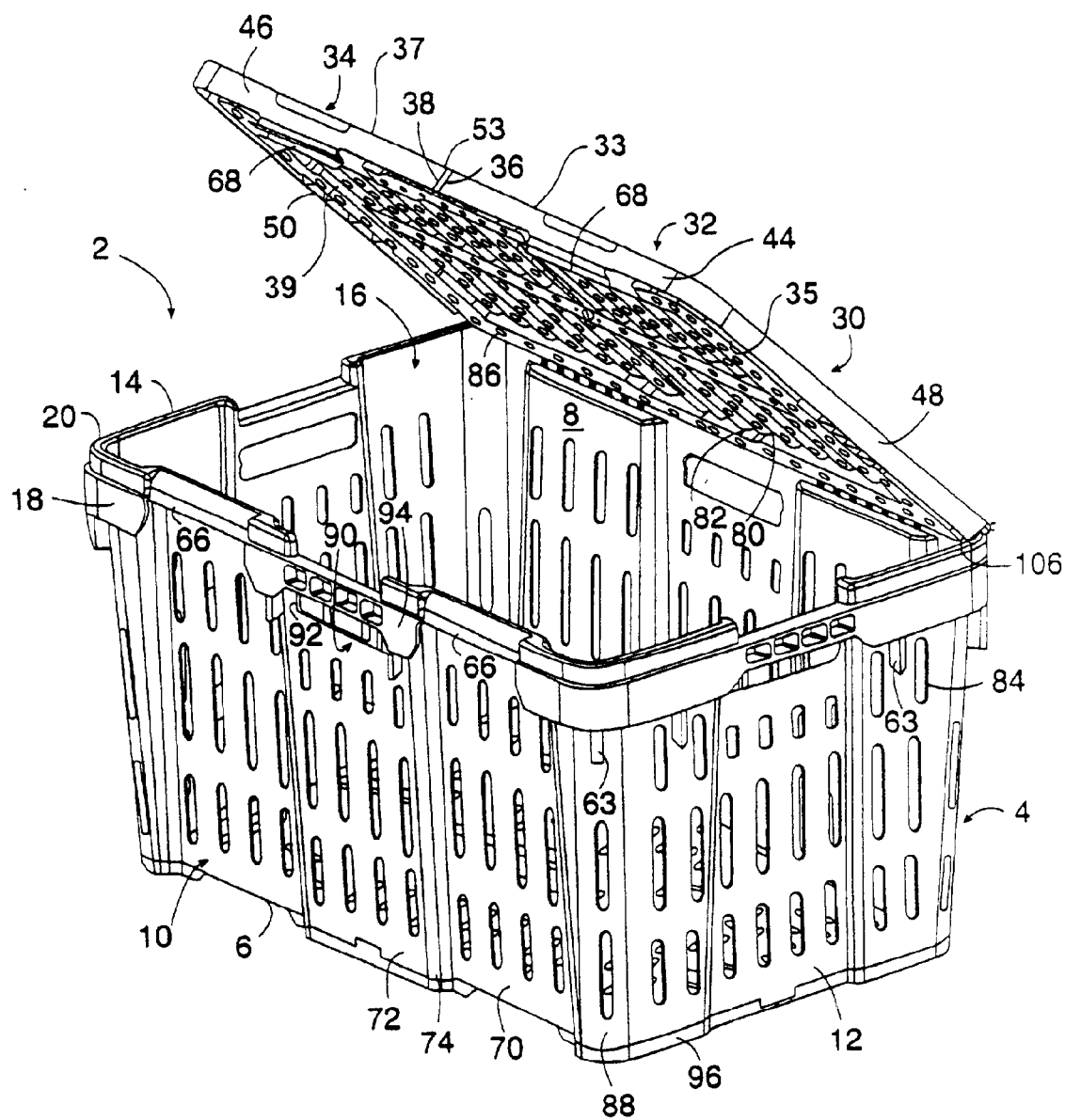
FIG. 3 is a schematic perspective view of the container of FIG. 1 with the lid attached to the container body and in a partially open position.

A plurality of fingers 58, having a generally arcuate profile, extend along first side edges 40, 42 of first and second panels 32, 34, respectively, as seen in FIG. 2. When lid 30 is attached to container body 4, fingers 58 extend outwardly through slots 26 and wrap at least partially around pivot pins 22, thereby providing a hinging action between lid 30 and container body 4, as shown by the dashed lines in FIG. 1. Fingers 58 are preferably formed of one piece construction with first and second panels 32, 34 When container body 4 is filled with produce, such as spinach for example, it is often overstuffed beyond the upper edges of the walls of the container body. Since pivot pins 22 act as fulcrums about which lid 30 rotates, leverage is thereby provided which allows lid 30 to compress the produce contained within the container 2 as lid 30 is closed, as seen in FIG. 3.

Figure 9:
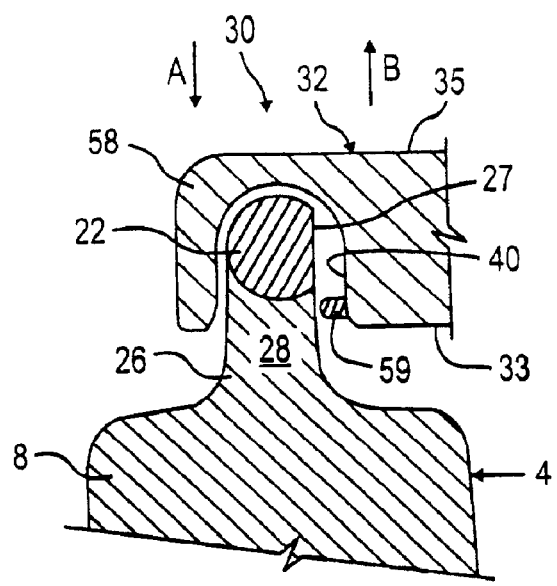
FIG. 9 is a schematic section view of another embodiment of the detachable connection of the lid and container of FIG. 1, shown in an open position.
Figure 10:
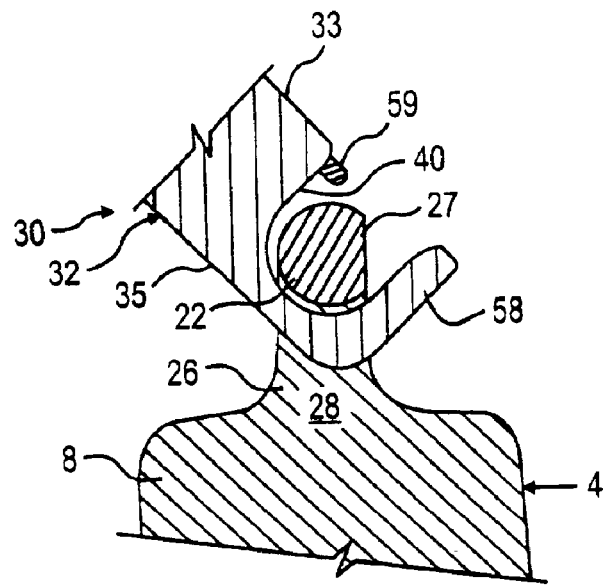
FIG. 10 is a schematic section view of another embodiment of the detachable connection of the lid and container of FIG. 1, shown in a partially closed position.

Another preferred embodiment is shown in FIGS. 7–10. Engaging members, such as projections 59, are formed on first and second panels 32, 34 of lid 30. For simplicity, only first panel 32 is illustrated here. In this embodiment, projections 59 have a rectangular cross-section and project outwardly from first side edge 40 of first panel 32, substantially parallel to the major planar surface of first panel 32. Engaged members, such as recesses 27, are formed on pivot pins 22. For simplicity, only one pivot pin 22 and its corresponding recesses 27 are shown here. Engaged member and engaging member, when used here, refer to members which cooperate to limit the range of positions in which lid 30 can be detached from container body 4. In operation, lid 30 is attached to container body 4, as seen in FIG. 9, by placing lid 30 in an inverted position such that bottom surface 35 faces upwardly, top surface 33 faces downwardly, and fingers 58 project downwardly. Lid 30 is then lowered onto container body 4 in the direction of arrow A, such that fingers 58 pass pivot pins 22. As lid 30 is lowered, projections 59 are aligned with and pass by recesses 27 without requiring deflection of projections 59. As lid 30 is then rotated toward its closed and upright position (counterclockwise in FIGS. 9, 10), fingers 58 curl around pivot pins 22 and extend through slots 26. As lid 30 rotates toward its closed position, projections 59 swing upwardly out of alignment with recesses 27 and move along the outside circumference of pivot pins 22. The cooperative engagement of fingers 58, projections 59 and pivot pins 22 prevents lid 30 from being detached from container body 4 when lid 30 is in its closed position as well as when lid 30 is in any position between its closed position and about 180' from its closed position, as can be seen in FIG. 10. As lid 30 is rotated from its closed position back to its open position depicted in FIG. 9, projections 59 move along the outer circumference of pivot pins 22 until they are again aligned with recesses 27, at which point projections 59 are able to move freely past pivot pin 22 and lid can be removed from container body 4 by lifting lid 30 upwardly away from container body 4 in the direction of arrow B. Such cooperative engagement of fingers 58, pivot pins 22, slots 26, projections 59 and recesses 27, advantageously insures that lid 30 will not inadvertently work free from container body 4 as it is being opened and closed, and will therefore remain safely secured to container body 4 during operative use.

Figure 4:
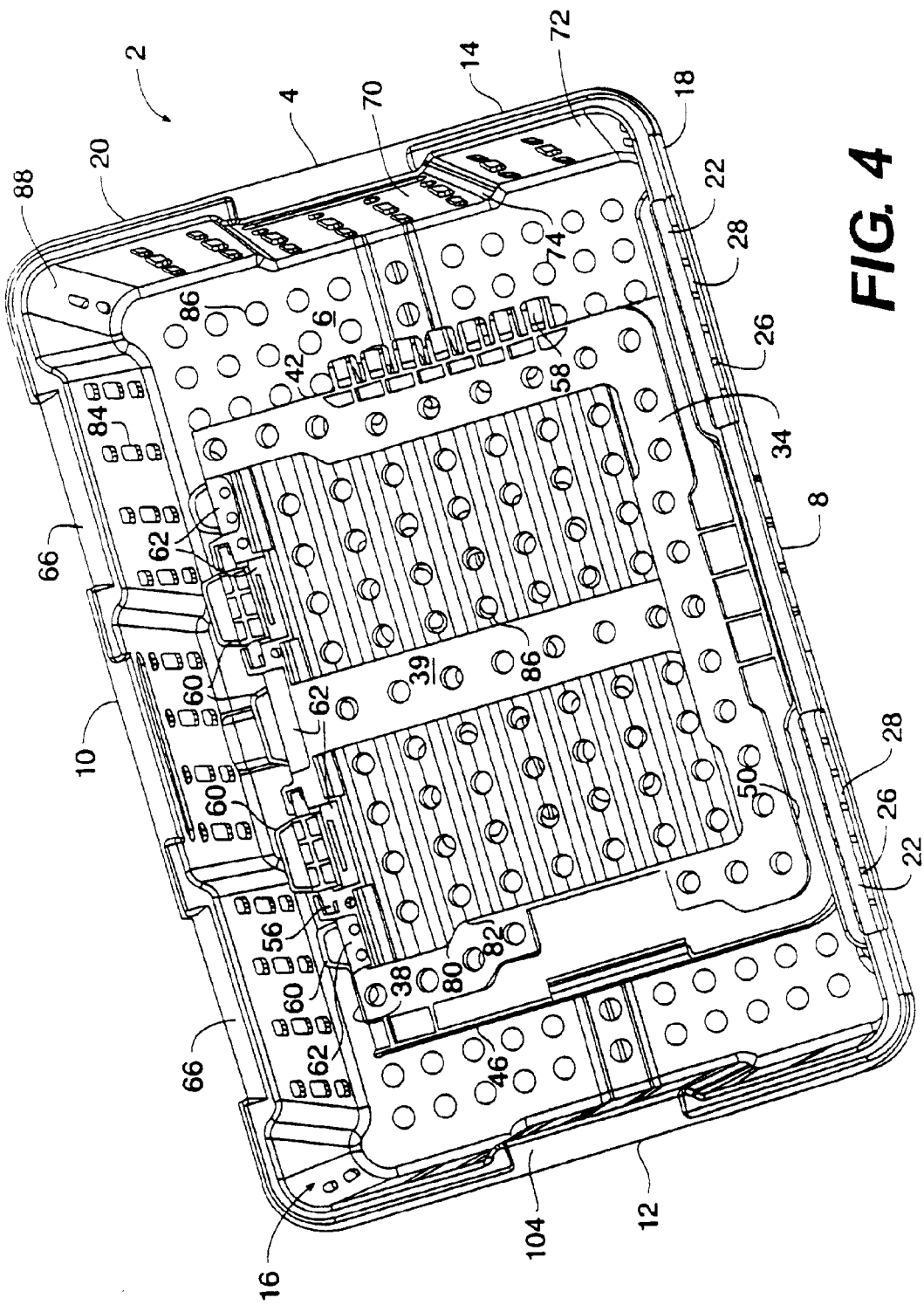
FIG. 4 is a schematic plan view of the container of the present invention with the lid folded about its hinge, rotated 90°, and stored on the bottom of the container.

Tabs 60 project from hinge edge 36 of first panel 32, as seen in FIG. 2 Recesses 62 are formed on bottom surface 35 of second panel 34, as seen in FIG. 4. When first and second panels 32, 34 are attached via hinge 52, tabs 60 extend beyond opposed hinge edge 38 and below second panel 34, and mate with corresponding recesses 62. The engagement of tabs 60 and recesses 62 prevents the pivoting of first and second panels 23, 34 downwardly about hinge 52. First and second panels can therefore only be rotated in one direction, namely upward, about hinge 52. Thus, when container 2 is filled with produce beyond the upper edges of container body 4, lid 30 can be closed with a force sufficient to compress the produce, yet without concern that the lid will collapse as it would if first and second panels 32, 34 were allowed to pivot downwardly about hinge 52. Tabs 60 therefore advantageously increase the rigidity of lid 30 and allow it to act as a one-piece lid when attached to container body 4. Tabs 60 are preferably formed of one piece construction with first panel 32.

Figure 5:
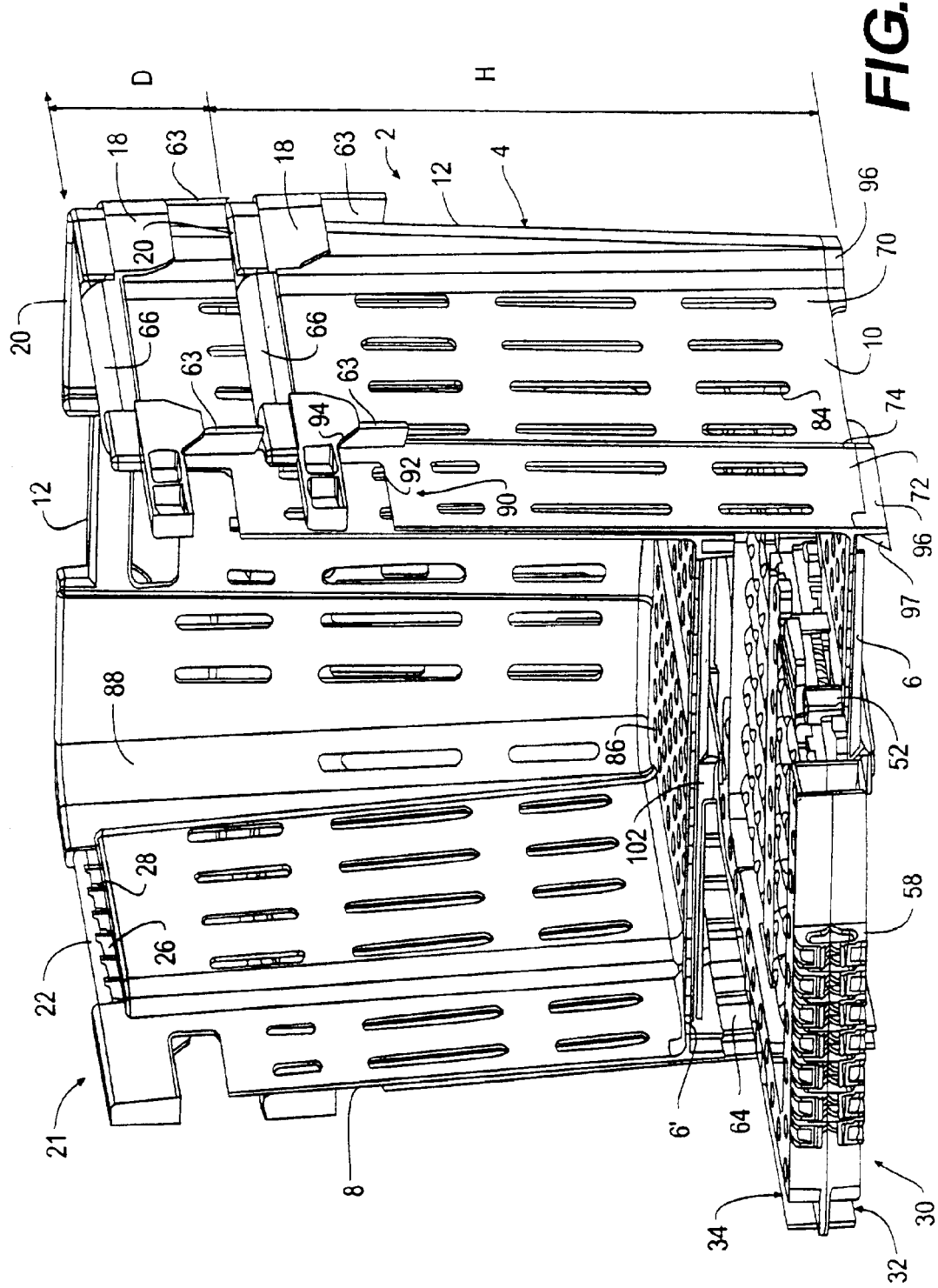
FIG. 5 is a schematic perspective view, shown partially cut away, of a pair of containers nested within one another, with the lid of the first of the containers stored on the bottom of the first container beneath the second container.

An advantage of the present invention is that multiple containers can be stacked along with their lids in a nesting fashion. To nest multiple containers, when empty, one into another, lid 30 must first be removed from container body 4. This is accomplished by rotating lid 30 upward from container body 4, as seen in FIG. 3, and pulling lid 30 away from first side wall 8. As lid 30 is pulled, fingers 58 are unseated from around pivot pins 22 and pulled free from slots 26 to the position shown in FIG. 1. Lid 30 is then folded in half by rotating one of first and second panels 32, 24 a full 180° about hinge 52. Alternatively, each of first and second panels 32, 34 could be partially rotated about hinge 52 such that top surfaces 33, 37 of first and second panels 32, 34, respectively, butt against one another. Folded lid 30 is then held such that the planes of top surfaces 33, 37 and bottom surfaces 35, 39 of first and second panels 32, 34, respectively, are substantially parallel to bottom 6, and then rotated 90° such that hinge edges 36, 38 and end edges 48, 50 are now parallel to first and second side walls 8, 10. Lid 30 is then placed on bottom 6 of container 2, as seen in FIG. 4. A second container 2' is then placed inside of container 2 as seen in FIG. 5. A plurality of supports 63 comprising flanges extend downwardly from lip 18 around the periphery of container 2. When container 2' is placed inside container 2, rim surface 20 of container 2 butts up against a lower surface of each support 63 of container 2'. The engagement of supports 63 and rim surface 20 prevents containers which are stacked in this manner from being tightly wedged together and difficult to separate. Due to the tapered walls of the containers 2, 2' and the interaction of rim surface 20 with supports 63, the containers are allowed to nest within one another such that a gap 64 is formed between the undersurface of bottom 6' of the upper container 2' and the top surface of bottom 6 of container 2. Lid 30, which has been placed on bottom 6 of container 2 thereby is situated within gap 64 Additional containers can be stacked on top of containers 2, 2' in such a nesting fashion with their lids stored in the corresponding gaps formed between the bottoms of the containers. The lids are advantageously kept with the containers when they are stacked and stored in this manner. In a preferred embodiment, containers 2 are dimensioned such that they nest in a ratio of about 4:1 That is, when container 2' nests within container 2, the height H of container 2 is about four (4) times the distance D which container 2' projects above rim surface 20 of container 2. A higher nesting ratio minimizes the vertical space required to store stacked containers and is therefore a desired advantage. Since lid 30 is folded a full 180°, its profile when folded in half is minimized, thereby minimizing gap 64 within which lid 30 fits and increasing the nesting ratio.

In a preferred embodiment, shoulders 66 are provided along an upper edge of second side wall 10, as seen in FIG. 3. Fasteners, for example flanges 68, are provided along second edges 44, 46 of lid 30 and are formed to engage shoulders 66 as lid 30 is closed on container body 4. Flanges 68 are resilient members which flex outwardly past shoulders 66 as lid 30 is closed and then return to their original position, thereby securely and positively retaining lid 30 on container body 4. To open container 2, flanges 68 are grasped and pulled outwardly and upwardly past shoulders 66, allowing lid 30 to be raised.

Figure 11:
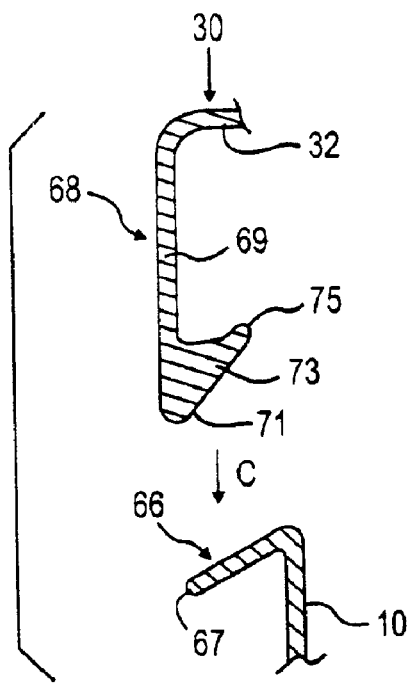
FIG. 11 is a schematic section view of another embodiment of the flange and shoulder of the container of FIG. 1, shown in an open position.
Figure 12:
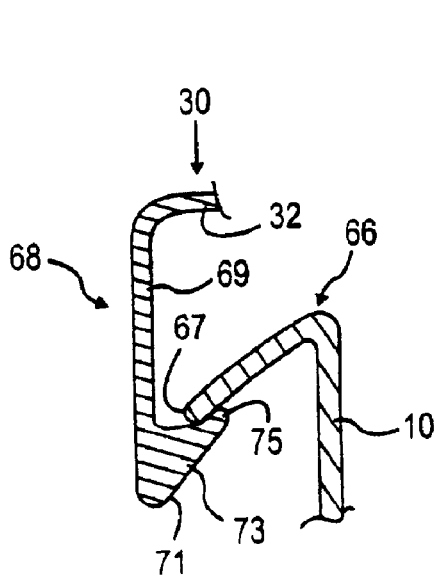
FIG. 12 is a schematic section view of the flange and shoulder of FIG. 11, shown in a closed position.
Figure 13:
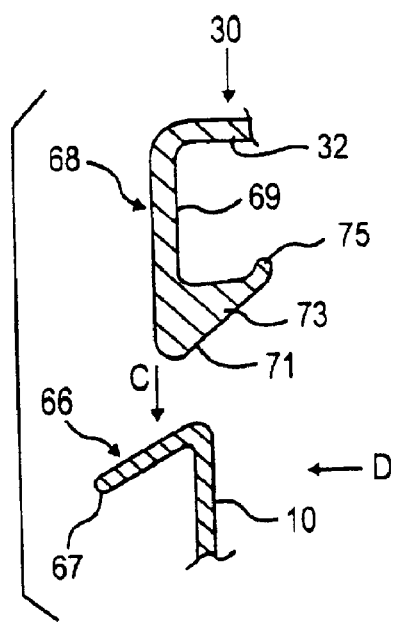
FIG. 13 is a schematic section view of the flange and shoulder of FIG. 11, shown in an open position with the container in an overstuffed condition.

One preferred embodiment of the construction of shoulders 66 and flanges 68 is illustrated in FIGS. 11–13. For simplicity, only the flange 68 along first panel 32 of lid 30 is illustrated. Flange 68 comprises a first portion 69 extending downwardly from first panel 32. An outer surface 71 of a second portion 73 is angled upwardly and inwardly from the lowermost end of first portion 69. Second portion 73 terminates in lip 75. Shoulder 66 is angled outwardly and downwardly from an upper edge of second side wall 10. As lid 30 is moved downwardly in the direction of arrow C toward its closed position, surface 71 engages shoulder 66. Flange 68 then flexes outwardly as surface 71 slides downwardly along shoulder 66, until lip 75 passes the end 67 of shoulder 66, at which point flange 68 flexes back inwardly to the position shown in FIG. 12. In this position, lid 30 is safely secured to container body 4 To release lid 30 from container body 4, a user simply grasps and pulls outwardly on flange 68, releasing lip 75 from shoulder 67, thereby allowing lid 30 to be fully opened.

In use, container body 4 is often over-stuffed with produce, such that second side wall 10 will flex outwardly in the direction of arrow D, as seen in FIG. 13 Flange 68 and shoulder 66 are constructed with a width such that in a static condition, i.e when container body 4 is empty, as shown in FIG. 11, they overlap one another by a significant amount. This insures that even when container body 4 is overstuffed, as seen in FIG. 13, flange 68 still overlaps shoulder 66. Therefore, the sloped surface 71 of second portion 73 can still contact and slide along the mutually sloped surface of shoulder 66, allowing lip 75 to engage shoulder 66 and secure lid 30 to container body 4.

First and second side walls 8, 10 and first and second end walls 12, 14 are, in certain preferred embodiments, formed of alternating recessed and projecting portions 70, 72 which are joined by shoulders 74. This non planar construction of the walls of container 2 advantageously adds to the rigidity of container 2.

First and second panels 32, 34 are formed with longitudinal channels 76, extending from end edges 48, 50, respectively to hinge edges 36, 38, respectively, as seen in FIG. 1. Longitudinal channels 76 are formed to receive longitudinal ribs 102, formed on the undersurface of bottom 6 of another container stacked on top of container 2, and which are described below in detail in reference to FIG. 6. The external surfaces of first and second panels 32, 34 contain alternating transverse ridges 80 and transverse channels 82, seen in FIG. 2, which provide added rigidity to lid 30.

Ventilation is needed within and around container 2 since fresh produce is typically housed within container 2.

Additionally, drainage is needed both when containers are filled with produce and when they are empty and stacked in a nesting manner. Slots 84 are formed in side walls 8, 10, end walls 12, 14, and corners 88, which are formed by the intersections of the container walls, in order to provide ventilation and or drainage for the contents of container 2. Holes 86 are formed in lid 30 and bottom 6 to provide additional ventilation and or drainage for container 2. Holes 86 in lid 30 work to ventilate container 2 when full, and act to drain it when empty, since lid 30 rests on bottom 6 of container 2 when empty containers are stacked. Slots 84 and holes 86 may have any shape that provides sufficient ventilation and or drainage for container 2. Corners 88 are rounded to provide space between adjoining containers when multiple containers are stored abutting one another. The spaces formed between adjacent containers by the inclined walls and the rounded corner construction of the containers allows air to flow around the containers as well as ice to be packed within these spaces to provide additional cooling.

In a preferred embodiment handles 90 are formed proximate central upper edges of first and second side walls 8, 10 and first and second end walls, 12, 14. Handles 90 are usually formed as apertures 92 in the respective walls and recesses 94 formed along lip 18 of container body 4 proximate the upper edges thereof. Handles 90 provide added rigidity to container body 4 and ease handling of the container 2.

Figure 6:
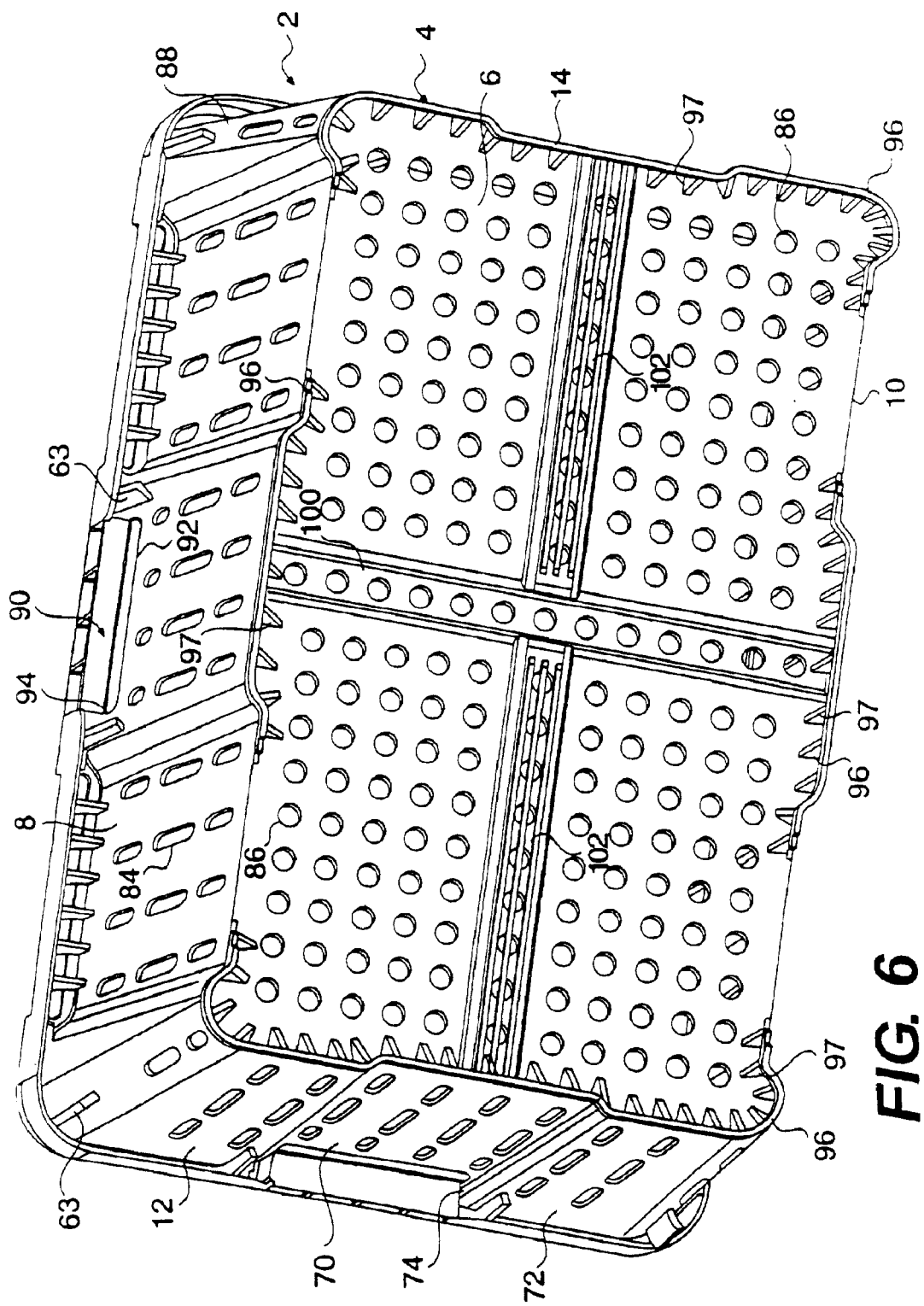
FIG. 6 is a schematic perspective view of the container of FIG. 1 showing the bottom of the container.
Figure 7:
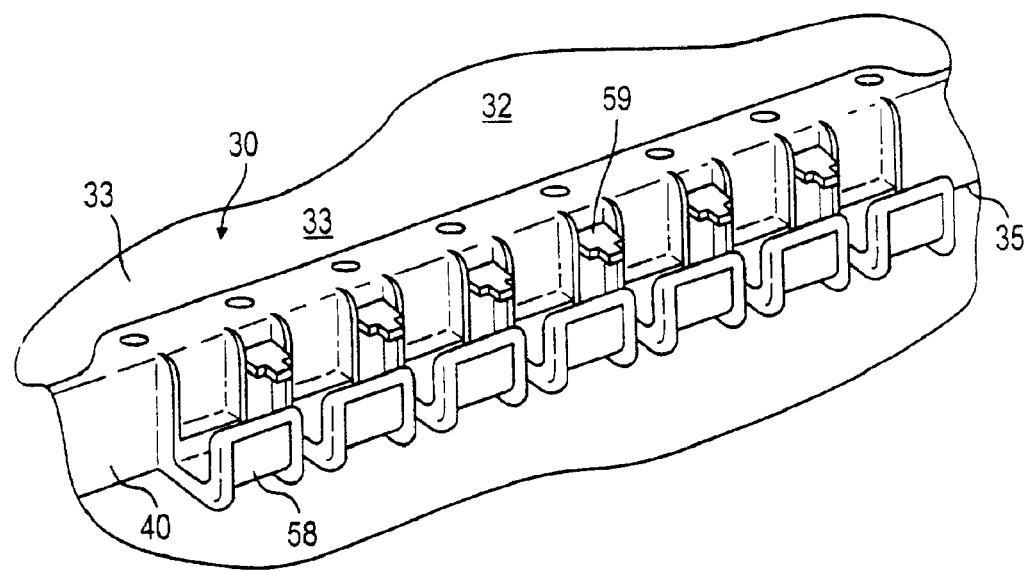
FIG. 7 is a schematic perspective view of another embodiment of the lid of the container of FIG. 1.
Figure 8:
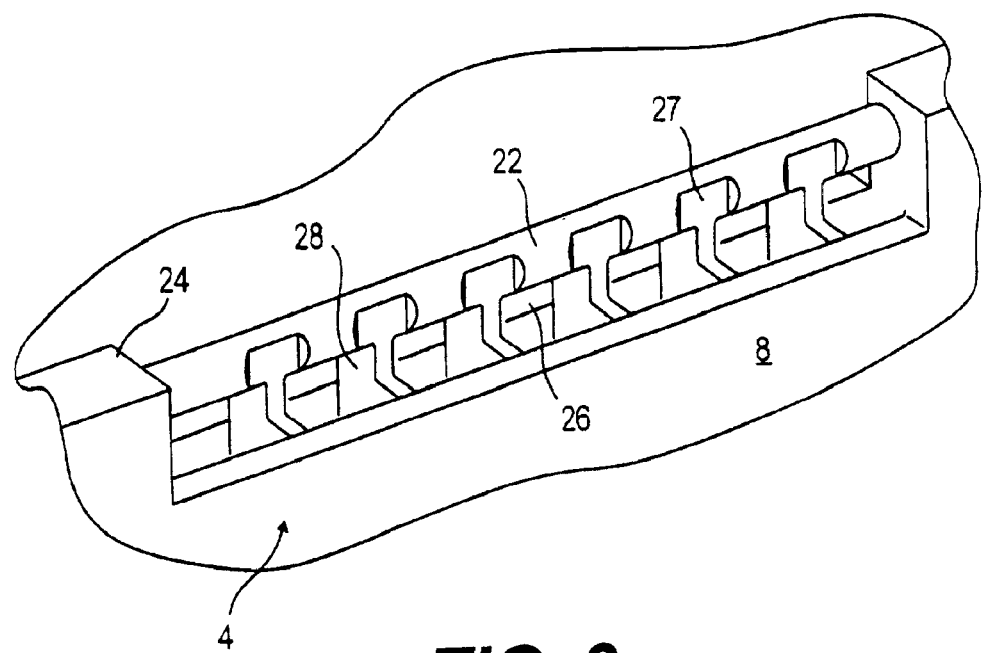
FIG. 8 is a schematic perspective view of another embodiment of the pivot pin of the container of FIG. 1

The underside of the container bottom 6 may, as shown in FIG. 6, be provided with feet 96 which are disposed along the outer perimeter of bottom 6. Feet 96 are supported by braces or gussets 97 which are preferably triangular shaped members which extend between feet 96 and bottom 6. Feet 96 cooperate with recesses 98 disposed along and proximate the outer edges of lid 30, as seen in FIG. 1. The cooperation of feet 96 and recesses 98 increases the stability of containers which are stacked with their lids attached. Transverse channel 100 extends from first side wall 8 to second side wall 10 of bottom 6 and is formed to receive a hinge 52 when the container 2 is stacked on top of another container which has its lid 30 attached. Longitudinal ribs 102 extend from first end wall 12 to transverse channel 100 and from second end wall 14 to transverse channel 100 along a central portion of bottom 6, similarly engaging with longitudinal channel 76 in lid 30 of another container, and provides added rigidity for container 2. The interaction of transverse channel 100 with hinge 52 and the interaction of longitudinal ribs 102 with longitudinal channels 76 also increases the stability of containers which are stacked with their lids attached.

Apron 104 is formed about the perimeter of lid 30 and comprises a double-walled member forming channel 106, seen in FIG. 2, which receives lip 18 of container body 4, thereby positively engaging lid 30 when container 2 is closed. Apron 104 additionally adds rigidity to container 2.

In light of the foregoing disclosure of the invention and description of certain preferred embodiments, those who are skilled in this area of technology will readily understand that various modifications and adaptations can be made without departing from the true scope and spirit of the invention. All such modifications and adaptations are intended to be covered by the following claims.

What is claimed is:

1. A container comprising:
   a generally rectangular bottom;
   generally rectangular opposed first and second side and end walls extending upwardly from the bottom;
   a lid detachably and pivotally secured to the first side wall, the lid having a lid edge, the lid having at least one engaging member provided on the lid proximate the lid edge; and
   a pivot member on an upper edge of the first side wall, the pivot member sized to receive the lid edge over an outer circumference thereof without requiring deflection of the at least one engaging member, wherein when the lid is in a first position, the lid edge is pivotally attached to the pivot member and the lid is prevented from detaching from the pivot member due to cooperation of the pivot member and the at least one engaging member, and when the lid moves to a second position approximately 180° from the first position, the at least one engaging member and the pivot member cooperate to allow the lid to become detachable from the pivot member.

2. The container of claim 1, wherein the first position of the lid is a closed position.

3. The container of claim 1 wherein the lid includes first and second panels, each panel having first and second side edges and an intermediate edge, the first side edges defining the lid edge.

4. The container of claim 3 further comprising a hinge extending along the intermediate edge of each of the first and second panels to operatively connect the first and second panels.

5. The container of claim 1, wherein the pivot member includes a pair of pivot pins fixedly secured to the first side wall.

6. The container of claim 1 further comprising at least one engaged member on the pivot member, the at least one engaged member cooperating with the at least one engaging member to prevent detachment of the lid from the container while the lid is in an orientation between the first position and a point less than approximately 180° from the first position.

7. The container of claim 1, wherein the pivot member is formed of one-piece construction with the first side wall.

8. The container of claim 1, wherein the lid includes a second edge opposite the lid edge, the lid including a fastener on the second edge and a shoulder on the second side wall, the fastener adapted to releasably engage the shoulder when the lid is in the first position.

9. The container of claim 8, wherein the fastener includes at least one resilient flange.

10. The container of claim 9, wherein the at least one resilient flange includes a first portion extending downwardly from the second edge, and a second portion having an exterior surface angled inwardly and upwardly from the first portion and terminating in a lip.

11. The container of claim 8, wherein the shoulder is angled downwardly and outwardly from the second side wall.

12. The container of claim 8, wherein the flange and the shoulder overlap one another when the lid is proximate the container in the first position.

13. A container comprising:
   a generally rectangular bottom;
   generally rectangular opposed first and second side and end walls extending upwardly from the bottom;
   a lid detachably and pivotally secured to the first side wall, the lid having a lid edge;
   a plurality of engaging members on the lid proximate the lid edge; and
   a pivot member on an upper edge of the first side wall, the pivot member including at least one pivot pin fixedly secured to the first side wall, the at least one pivot pin having a plurality of engaged members formed therein, the at least one pivot pin cooperating with the engaging members to prevent detachment of the lid from the container while the lid is in a closed position and while the lid is in an open position less than approximately 180° from the closed position, wherein alignment of the engaging members and the engaged members allows for unobstructed removal of the lid when the lid is in an open position approximately 180° from the closed position.

14. The container of claim 13, wherein the pivot member includes a plurality of legs spaced along and interconnecting the at least one pivot pin and the first side wall.

15. The container of claim 13, further comprising a plurality of fingers formed on the lid edge to detachably and pivotally secure the lid to the at least one pivot pin.

16. The container of claim 13, wherein the engaging members each include a projection extending outwardly from the lid edge.

17. The container of claim 13, wherein the engaged members each include a recess formed on the pivot member.

18. The container of claim 13, wherein the lid includes first and second panels which are operatively connected.

19. The container of claim 18, wherein each panel includes first and second side edges and an intermediate edge, the first side edges defining the lid edge, the lid further comprising a hinge extending along the intermediate edges of each of the first and second panels to operatively connect the first and second panels.

20. The container of claim 13, wherein the lid includes a second edge opposite the lid edge, the lid including a fastener on the second edge and a shoulder angled downwardly and outwardly from the second side wall, the fastener adapted to releasably engage the shoulder when the lid is in the closed position.

21. A container comprising:
a generally rectangular bottom;
generally rectangular opposed first and second side and end walls extending upwardly from the bottom;
a lid detachably and pivotally secured to the first side wall, the lid having first and second panels, each panel having first and second side edges and an intermediate edge, the first side edges defining a lid edge, the lid edge having at least one engaging member;
a pivot member on an upper edge of the first side wall wherein when the lid is in a first position, the lid edge is pivotally attached to the pivot member over an outer circumference thereof and the lid is prevented from detaching from the pivot member due to obstruction of the pivot member by the at least one engaging member, and when the lid moves to a second position approximately 180° from the first position, the at least one engaging member no longer obstructs the pivot member and the lid becomes detachable from the pivot member;
a shoulder on an upper edge of the second side wall; and
a fastener on at least one of the second side edges, the fastener arranged to releasably engage the shoulder when the lid is in the first position.

22. The container of claim 21, further comprising a hinge extending along the intermediate edges of each of the first and second panels to operatively connect the first and second panels.

23. The container of claim 21, wherein the at least one engaging member includes a plurality of projections on the lid proximate the lid edge, and wherein the pivot member includes a pair of spaced pivot pins each including a plurality of recesses formed therein for cooperating with the projections to prevent detachment of the lid from the container while the lid is in an orientation between the first position and a point less than approximately 180° from the first position.

24. The container of claim 21, further comprising a plurality of fingers formed on the lid edge to detachably and pivotably secure the lid to the pivot pins, and wherein the pivot member includes a plurality of legs spaced along and interconnecting the pivot pins and the first side wall.

25. The container of claim 21, wherein the fastener includes at least one resilient flange having a first portion extending downwardly from the at least one second side edge, and a second portion having an exterior surface angled inwardly and upwardly from the first position and terminating in a lip, wherein the flange and the shoulder overlap one another when the lid is proximate the container in the first position.

26. A container comprising:
a generally rectangular bottom;
generally rectangular opposed first and second side and end walls extending upwardly from the bottom;
a lid detachably and pivotally secured to the first side wall, the lid having a lid edge, the lid having at least one engaging member provided on the lid proximate the lid edge; and
a pivot member on an upper edge of the first side wall wherein when the lid is in a first position, the lid edge is pivotally attached to the pivot member and the lid is prevented from detaching from the pivot member due to cooperation of the pivot member and the at least one engaging member, and when the lid moves to a second position approximately 180° from the first position, the at least one engaging member is able to move freely past the pivot member to allow the lid to become detachable from the pivot member.

* * * * *